July 31, 1973  W. P. ANDREWS ET AL  3,749,629
METHOD OF MAKING A DECORATIVE LAMINATION
Filed March 12, 1971  3 Sheets-Sheet 3
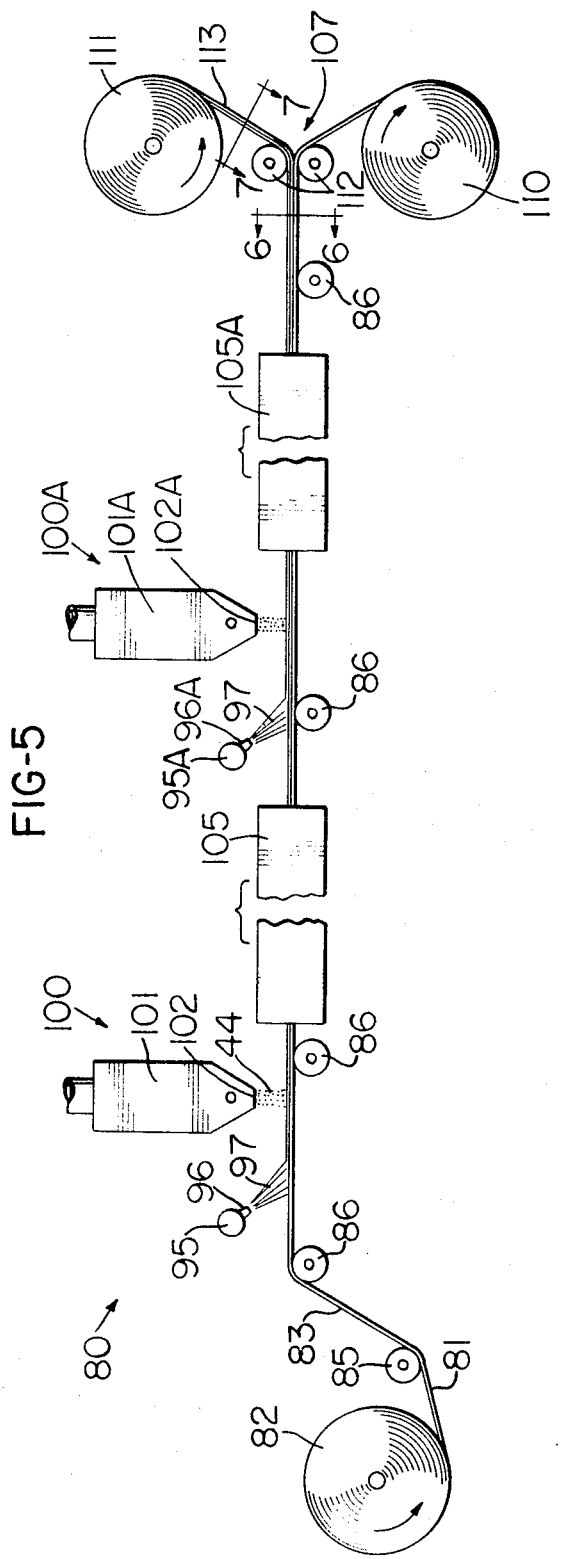
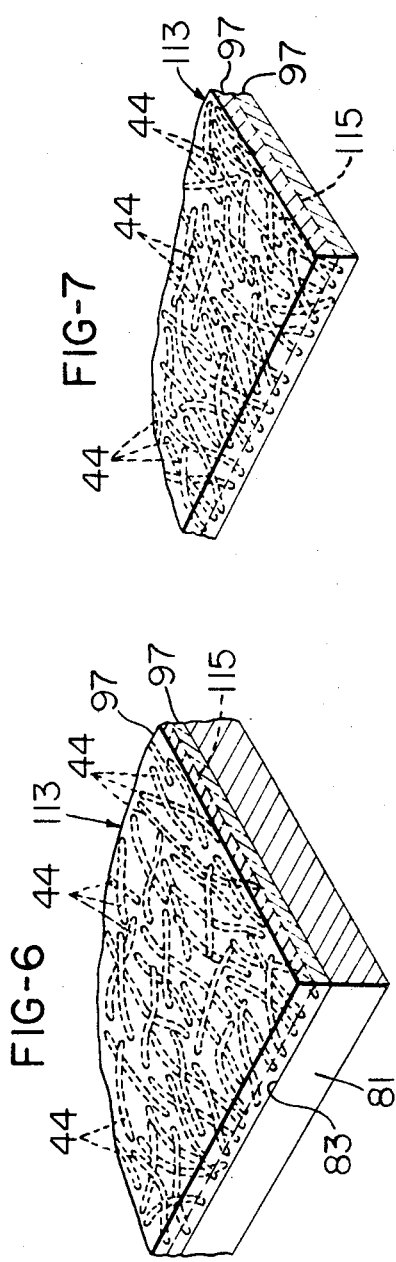
INVENTORS
WILLIAM P. ANDREWS
JACK L. BEUTH
BY Glenn, Palmer, Lyne,
Gibbs, & Thompson
THEIR ATTORNEYS United States Patent Office 3,749,629
Patented July 31, 1973

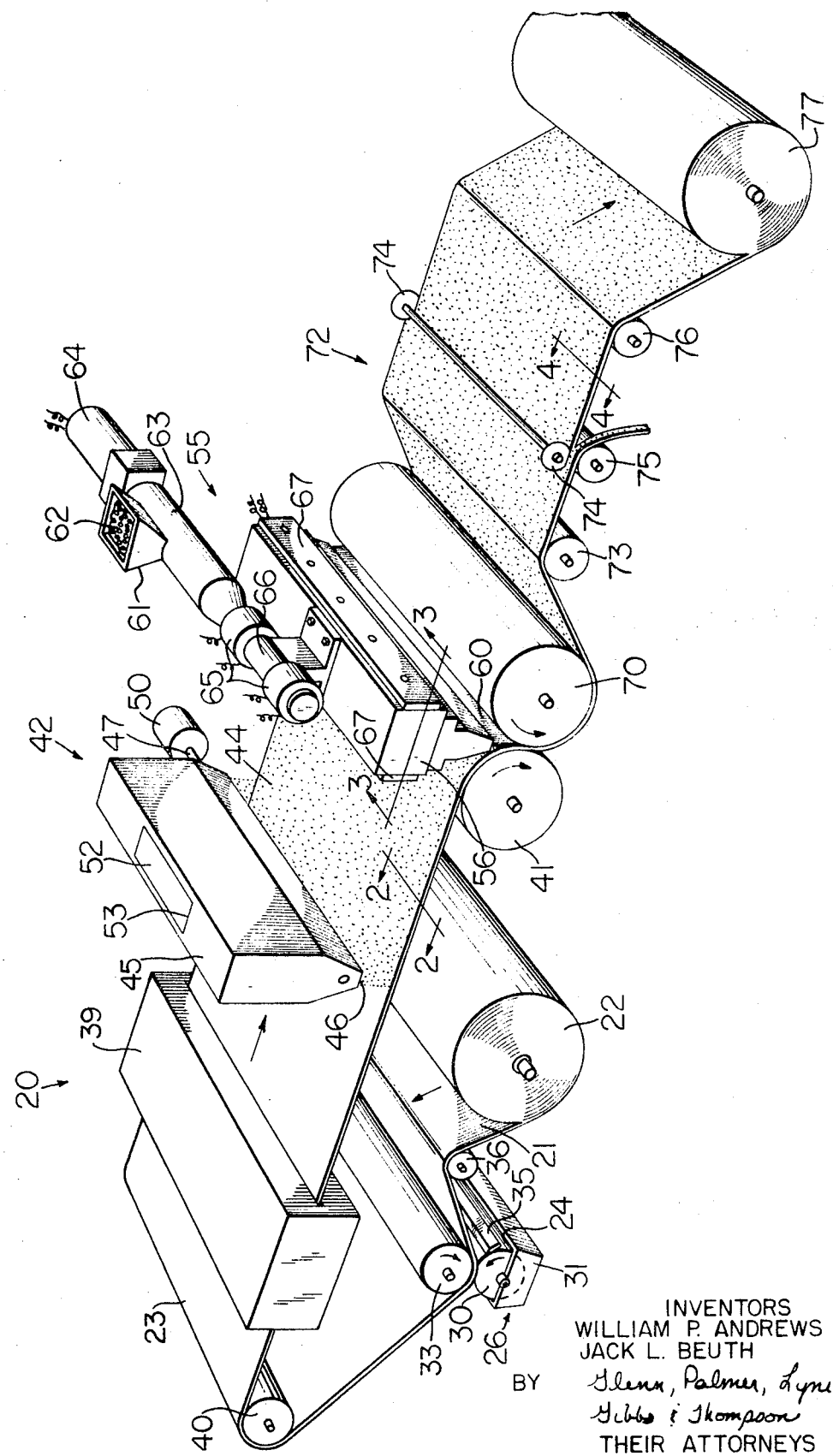

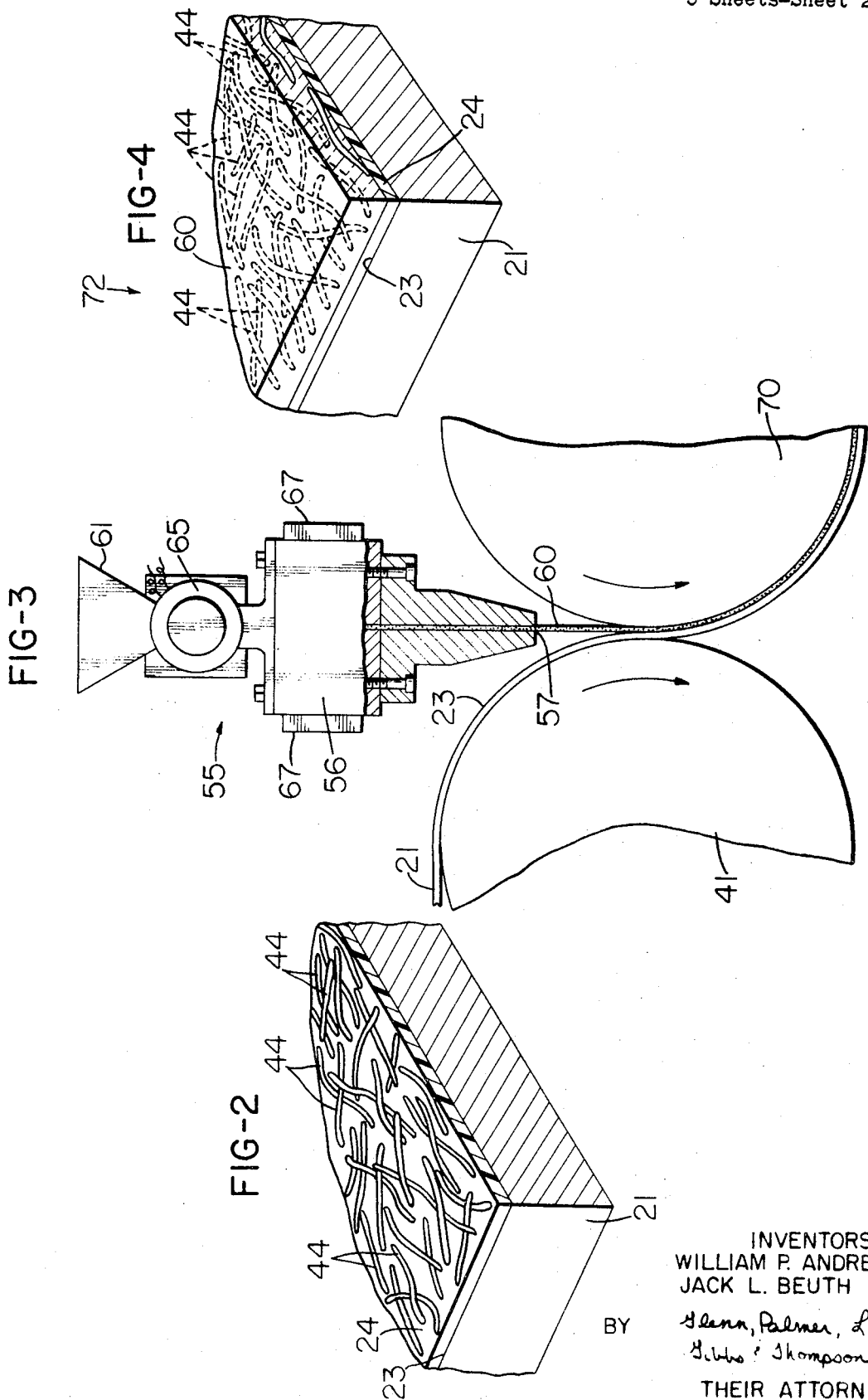

3,749,629
METHOD OF MAKING A DECORATIVE
LAMINATION
William P. Andrews, Richmond, and Jack L. Beuth,
Chesterfield, Va., assignors to Reynolds Metals Company, Richmond, Va.
Filed Mar. 12, 1971, Ser. No. 123,740
Int. Cl. B32b 31/30
U.S. Cl. 156—276  16 Claims

ABSTRACT OF THE DISCLOSURE

This disclosure relates to an apparatus for and method of making a decorative lamination in a continuous process wherein particles of decorative material are surrounded by a liquid plastic film which is then solidified around such particles to provide a solid transparent sheet-like matrix having the particles embedded therewithin so that they are readily visible.

BACKGROUND OF THE INVENTION

There are many laminated constructions in present use which have decorative particles embedded therewithin; however, such present constructions are generally produced by sandwiching the particles between previously formed individual sheets, which results in added expense to individually form and handle such sheets.

SUMMARY

This invention provides an improved apparatus for and method of making a decorative laminated construction in which the embedding of particles of decorative material is achieved simultaneously with the forming of a solid sheet-like matrix surrounding such particles to provide an improved high strength construction having optimum aesthetic appeal.

Other details, uses, and advantages of this invention will become apparent as the following description of the embodiments thereof presented in the accompanying drawings proceeds.

BRIEF DESCRIPTION OF THE DRAWINGS

The accompanying drawings show present preferred embodiments of this invention, in which FIG. 1 is a perspective view with parts in section and parts broken away illustrating one exemplary embodiment of this invention;

FIG. 2 is a greatly enlarged fragmentary perspective view taken on the line 2—2 of FIG. 1;

FIG. 3 is a view with parts in section and parts broken away taken on the line 3—3 of FIG. 1;

FIG. 4 is a greatly enlarged fragmentary perspective view taken on the line 4—4 of FIG. 1;

FIG. 5 is a schematic view with parts broken away illustrating another exemplary embodiment of this invention;

FIG. 6 is a greatly enlarged fragmentary perspective view of the laminated construction as formed by the apparatus and method of FIG. 5 and taken essentially on the line 6—6 of FIG. 5; and FIG. 7 is a greatly enlarged fragmentary perspective view similar to FIG. 6 taken on the line 7—7 of FIG. 5 and taken after the release sheet supporting the laminated construction has been separated from such laminated construction.

DESCRIPTION OF ILLUSTRATED EMBODIMENTS

Reference is now made to FIG. 1 of the drawings wherein one exemplary embodiment of the apparatus and method of this invention is illustrated and designated generally by the reference numeral 20. The apparatus 20 comprises a plurality of cooperating rolls for continuously moving a web of material 21 from a supply roll 22 and along the apparatus 20 to enable particles of decorative material to be deposited on one surface of web 21 and surrounded by a liquid film of plastic material which is then solidified to form a solid continuous and substantially transparent sheet-like matrix which has the particles of decorative material embedded therewithin and as an integral part thereof so that portions of such particles are readily visible.

The web 21 is unwound from its supply roll 22, which is suitably supported for free unwinding rotation, and in this exemplary embodiment of the invention one surface 23 of web 21 is coated with a liquid adhesive material 24 to provide a tacky surface. A suitable adhesive applicator or coater designated generally by the numeral 26 is provided for coating the surface 23 with adhesive 24.

The coater 26 comprises a coating roller 30 which is suitably supported for rotation within a reservoir or tray 31 containing the liquid adhesive material 24. Another roller 33 is provided as a backup roller and cooperates with coating roller 30 to urge surface 23 of web 21 into contact with the outer periphery of coating roller 30 as the web 21 is unwound from its supply roll 22 and moved between rollers 30 and 33. The coater 26 also has a doctor blade 35 provided as a part thereof and doctor blade 35 removes the excess adhesive 24 which may accumulate on the coating roller 30 as it rotates through the liquid adhesive 24 contained in reservoir 31.

A turn roll 36 is also provided as a part of apparatus 20 and assures that the web 21 approaches the adhesive coater 26 at the desired angle. The roll 36 may also be utilized to assure that the desired tension is provided in the web 21.

The web 21 with its surface 23 coated with adhesive material 24 is moved upwardly and around a turn roll 40 which is suitably supported for rotation and arranged above the coater 26. The web 21 is then moved through a drying oven 39 and over another roll 41 arranged parallel to and in spaced apart relation from roll 40. The oven 39 serves to drive off solvent from the adhesive applied by the coater 26 whereby the adhesive has a tacky consistency. The function of the roll 41, in addition to supporting the web 21 in a horizontal plane, in this example, will be described in detail hereinafter; however, it will be appreciated that the portion of the web 21 traveling between rollers 40 and 41 need not necessarily be in a horizontal plane.

A depositing device designated generally by the numeral 42 is arranged over web 21 at a location between rolls 40 and 41 and the depositing device 42 is utilized for depositing particles of decorative material 44 on surface 23 of web 21. The depositing device 42 comprises a receptacle 45 which has an opening 46 provided in its lower end portion and through which the particles of decorative material are released so that they fall on the tacky top surface 23 of web 21 in a random manner and as pulled by the force of gravity.

In this example of the invention the depositing device 42 also includes a mechanical disperser 47 which may be in the form of an agitating bar, for example, which is arranged within receptacle 45 and suitably driven by an electric motor 50 to mechanically disperse the desired amount of particles 44 onto web 21 as it is moved under the depositing device 42. As will be apparent from FIG. 1 of the drawings, the receptacle 45 comprising depositing device 42 extends substantialy across the full width of web 21 to thereby assure that particles 44 are deposited across the full width of the top surface 23. The receptacle 45 may also be provided with a suitable access door 52 and associated filling opening 53 to enable easy filling of receptacle 45 with particles 44.

The decorative particles 44 provided within receptacle 45 and mechanically dispersed from within such receptacle may be any desired decorative particles. However, particles comprised substantially of chaff and flock of aluminum foil, which have surfaces which reflect light, have been particularly effective in providing a decorative lamination when embedded within a transparent plastic material and in a manner as will be described in detail hereinafter.

Apparatus 20 also has an applicator designated generally by the numeral 55 for applying a film of liquid plastic material on the top surface 23 of web 21 so that it surrounds the particles 44. The applicator 55 in this example of the invention is comprised of an extruding head 56, see FIGS. 1 and 3, which has an extruding opening 57 in the form of an elongated slit at the lower end of the extruding head 56 and through which a liquid plastic material in the form of a liquid thermoplastic sheet 60 is extruded.

The applicator 55 of this example of the invention has a hopper 61 within which plastic pellets 62, or the like, are placed and fed by means of a screw feed assembly 63 which is driven by a motor 64. The plastic pellets 62 are moved from within hopper 61 to a location immediately above the extruding head 56.

Heaters shown in this example of the invention as electrical heaters 65 are provided for heating the plastic pellets 62 in a chamber 66 provided at the terminal end of the screw feed assembly 63. The electrical heaters 65 melt the plastic pellets 62 causing the resulting liquid plastic material 60 to move within a cavity provided in the extruding head 56. Electrical heaters 67 are also provided on the extruding head 56 to further assure that the molten plastic retains its liquid form and flows smoothly through the extruding opening 57 at the lower end of the extruding head 56 onto top surface 23 of web 21 and across the full width thereof.

The liquid thermoplastic film 60 is applied on particles 44 so that it surrounds such particles and substantially simultaneously with the application of the liquid plastic film 60 on surface 23 the resulting construction is passed between roll 41 and a cooling roll 70 which cooperates with the roll 41 to compress and control the thickness of the film 60 that is extruded on surface 23 and around the decorative particles 44. The cooling roll 70 provides simultaneous cooling together with the compressing action and such cooling serves to solidify the liquid film 60 causing it to form a solid and continuous sheet-like matrix which has particles 44 embedded therewithin as an integral part thereof and such cooling also causes the plastic 60 to be bonded securely to the top surface 23 of web 21. The cooling roll 70 may be cooled by any suitable known means.

The liquid plastic film 60 is in the form of a transparent liquid plastic film which retains its transparent character after solidifying and after being securely bonded to web 21 after passing web 21 and film 60 with the particles 44 dispersed therein between roll 41 and cooling roll 70. Thus, the resulting laminated construction has a pleasing appearance which is created by the character of the decorative particles and their ready visibility through the solid transparent film-like matrix 60 which is bonded against web 21.

The decorative particles 44 are preferably dispersed by mechanical disperser 47 from within receptacle 45 in a random manner as will be apparent from FIG. 2 of the drawings. It will also be seen from FIG. 4 of the drawings that the random character of the dispersed particles 44 is retained in an integral bonded construction which in effect is comprised of the web or sheet 21 which has a transparent matrix bonded thereagainst and such matrix has the particles 44 embedded therewithin as an integral part thereof.

The decorative lamination produced by the apparatus and method illustrated in FIG. 1 is designated generally by the reference numeral 72 and may be seen in enlarged fragmentary perspective view in FIG. 4. After the decorative lamination is moved away from the cooling roll 70 it is moved past another turn roll 73 and then has its opposite side edges suitably trimmed by a pair of rotary trimmers each designated by the same reference numeral 74 and each being utilized in association with the back-up roll 75. The portions of decorative lamination 72 which are trimmed by trimmers 74 are discarded and the resulting construction is then moved over another turn roll 76 and wound to form a supply roll 77 from which sections of laminated construction 72 may be unwound and used as desired.

The web 21 which is used in forming decorative lamination or laminated construction 72 may be made of any suitable material including paper, paper board, plastic film, metallic foil, cloth, or any material which may be moved in a continuous manner over a system of rolls essentially as illustrated in FIG. 1 of the drawings.

In addition, the adhesive 24 may be in the form of any adhesive which is capable of providing a tacky surface while also providing a suitable bond between the web 21 and the plastic material 60. Further, the method in which the adhesive is applied need not necessarily be confined to the use of a coater which utilizes a coating roller but may be applied by any other suitable means such as by spraying, or other suitable technique.

The film 60 may also be defined by any plastic material which is capable of being extruded onto a web in liquid form. Examples of such plastic materials are polyethylene, polypropylene, ionomers, nylons, polyesters, polycarbonates, vinyls, and many others, depending on the properties that are desired in the ultimate decorative lamination or laminated construction.

Also, it may be preferred that an adhesive should not be applied on the top surface 23 of web 21. For example, a laminated construction similar to construction 72 may be formed by spraying a small amount of plastic film on particles 44 upstream of roll 41 rather than extruding such film in sheet form from applicator 55 in the manner illustrated and between the rolls 41 and 70.

In addition, the materials utilized for the web 21 and the particles 44 may be provided with electrostatic charges so that the particles 44 would be attracted to the top surface 23 of web 21 so that plastic film 60 could be applied either by the applicator 55 or by a spray type applicator as desired and again without utilizing an adhesive.

In any event, whether or not an adhesive material is utilized, it will be appreciated that a liquid plastic film is applied on the top surface 23 of web 21 so that it surrounds the decorative particles 44 in a substantially liquid form and the apparatus and method of this invention make it possible to form a protective sheet for the particles 44 which is in the form of a solid plastic matrix having particles 44 embedded therewithin. Further, the embedding action takes place essentially in a one-step operation which is substantially simultaneous with the forming of the solid plastic sheet which is also simultaneously bonded to web 21 in a simple and inexpensive manner.

In addition to forming the web 21 of any desired material as explained above it may be preferred to form web 21 so that its top surface is white, black, or any desired color. Upon applying the decorative particles on a colored surface it will be appreciated that a decorative surface is provided which, when viewed through the transparent plastic material, provides optimum contrast and optimum aesthetic appeal.

In particular it will be appreciated that when the decorative particles are made of aluminum chaff or flock the bright and shiny appearance of the aluminum when viewed through the clear plastic against a colored background which may be white, black, or any desired color provides optimum contrast and a striking appearance, so that the resulting laminated structure may be used in applications where beauty is important.

Another exemplary embodiment of this invention is illustrated in FIG. 5 of the drawings and designated generally by the numeral 80. The apparatus 80 utilizes a web of material 81 which is unwound from a supply roll 82 and continuously moved along apparatus 80 by a plurality of cooperating rolls to be described in detail hereinafter. The web 81 is moved past various stations at which substantially transparent liquid plastic material material and decorative particles are deposited thereon so that the liquid plastic surrounds such particles whereupon the liquid plastic is solidified to define another embodiment of a decorative lamination or laminated construction which is comprised essentially of a solid transparent matrix having the decorative particles embedded therewithin. The decorative lamination provided by the apparatus and method of FIG. 5 is easily separated from its web 81 and the web 81 may be utilized again or discarded as desired.

The web 81 is in the form of a release sheet which may be made of any suitable material which preferably has one surface shown as a top surface 83 which is resistant to adhesion by any material or substance that may be applied or deposited thereagainst. The adhesion resistant surface may be the inherent character of the material which defines web 81. However, such adhesion resistant surface may be provided by suitably coating web 81 with any material which provides resistance to adhesion to any material or substance that may be applied thereagainst. For example, web 81 may be made of Teflon or the like or have its top surface coated with Teflon, silicon, or other like materials which would resist adhesion.

The apparatus 80 comprises a turn roll 85 for turning the release sheet or web 81 so that it approaches a roll 86 at a desired angle and a plurality of rolls also designated by the numeral 86 are arranged with their axes parallel and in a horizontal plane so that the web 81 may be moved in a substantially horizontal plane along apparatus 80.

Apparatus 80 has an applicator for applying a film of liquid plastic material and such applicator is illustrated as a spray head which is designated by the reference numeral 95. The spray head 95 may have a plurality of nozzles each designated by the numeral 96 which enable a liquid plastic material 97 which is sprayed from the spray head 95 to be sprayed in a uniform manner across the full width of the web 81. The liquid plastic material 97 which is applied by the spray nozzles 96 may be in any desired form; however, it is preferably in the form of plastic lacquer.

Apparatus 80 also has a depositing device designated generally by the numeral 100 and utilized for depositing particles of decorative material onto top surface 83 of web 81 essentially in a similar manner as described in connection with depositing device 42 of apparatus 20. The depositing device 100 comprises a receptable 101 which has decorative particles of material, also designated by the numeral 44 as in the previous embodiment of this invention, and such particles 44 may be dispersed from an opening 102 provided in the lower end portion of receptacle 101 by a mechanical dispersing device so as to drop by gravity from opening 102 and across the full width of the web 81.

The particles 44 are distributed in a random manner on the top surface 83 of web 81 and in this example of the invention are shown as being dispersed on surface 83 after the application of plastic lacquer 97 so that they will readily adhere thereagainst. However, the particles 44 may be introduced onto an non-adhesive surface 83 of web 81 essentially as a first operation upstream of the applicator or spray head 95, if desired.

In any event, whether the liquid plastic material or plastic lacquer 97 is applied first, followed by the decorative particles 44, or applied second after first depositing the decorative particles 44 on top surface 83 of web 81, the liquid plastic lacquer 97 completely surrounds the particles 44 in preparation for solidification of such plastic lacquer in a manner to be presently described.

Apparatus 80 comprises solidifying means for solidifying the liquid plastic lacquer 97 and such solidifying means in this exemplary embodiment of the invention is shown as a drying oven 105. The drying oven 105 has suitable heating elements and controls provided therein so that as the web or release sheet 81 and the particles 44 surrounded by liquid lacquer 97 are moved through oven 105 the heat of oven 105 drives off the volatile constituents of the plastic lacquer so that a laminated construction is defined in which a transparent sheet-like matrix is provided by the now solidified plastic lacquer 97 and such matrix has the decorative particles 44 embedded therewithin as an integral part thereof.

The apparatus and method 80 may comprise a separator for separating the release sheet or web 81 from the remainder of the construction immediately downstream of oven 105 if desired. However, in this example of the invention, another spray head, depositing device, and oven designated respectively by the nunmerals 95A, 100A and 105A, are provided. The spray head 95A, depositing device 100A and oven 105A are identical in construction and function to the previously described components 95, 100 and 105 respectively, hence the decription of their operation will not be repeated.

It will be appreciated that a spray head, depositing device, and solidifying means may be provided in any desired number of sets downstream of oven 105 and preferably arranged in the same relative positions as the components 95, 100, 105 so as to provide a decorative laminated structure which has the decorative particles 44 embeded within a multiple layer transparent matrix of plastic material. In the exemplary embodiment of this inveniton shown in FIG. 5 a two layer laminated construction is defined and illustrated in enlarged fragmentary perspective view in FIGS. 6 and 7.

A separator is provided with apparatus 80 and used to separate the release sheet 81 from the remainder of the laminated construction and such separator is designated generally by the reference numeral 107 in FIG. 5. Separator 107 comprises a rotatable roll 110 about which the release sheet 81 is wound and a rotatable roll 111 about which the remaining laminated structure defined by apparatus 80 is wound. In addition, separator 107 includes a pair of cooperating rollers each designated by the same numeral 112 which are arranged downstream of the last roll 86.

The winding action created by rollers 110 and 111 separates the laminated structure designated by the numeral 113 and defined by apparatus 80 from the release sheet 81. This separation is easily achieved because, as previously explained, the top surface 83 of the release sheet 81 resists adhesion. The rollers 110 and 111 are suitably driven in a synchronized manner so as to maintain the laminated construction 113 extending between rolls 112 and 111 at substantially the same degree of tightness as the portion of release sheet 81 extending between rolls 112 and 110. This controlled tension and controlled separation takes into account the differences in diameters that may occur during winding of the release sheet 81 on its roll 110 and the laminated structure 113 on its roll 111.

In any event it will be appreciated that the apparatus and method illustrated in FIG. 5 of the drawings enable the provision of a laminated structure 113 which is readily separated from a release sheet which supports the constituent parts of such laminated structure during the process of forming thereof. Basically the laminated structure 113 is defined by applying decorative particles 44 on release sheet 81, applying a film of liquid plastic material 97 so that it surrounds the decorative particles, and then solidifying the plastic material so that it forms a continuous solid web in the form of a sheet-like matrix which has the decorative particles embedded therewithin as an integral part thereof.

The decorative particles 44 may be made of any suitable decorative material. However, as previously mentioned, particles 44 are preferably in the form of flock and chaff of aluminum foil.

The liquid plastic material which is applied in the form of lacquer 97 may be any clear liquid plastic and may be comprised of materials such as polyurethane, vinyl, cellulose acetate, cellulose acetate butyrate, cellulose propionate, cellulose nitrate, epoxy, polyamide, acrylic or elastomeric polymers such as acrylonitrile, styren butadiene, chloroprene, and other similar materials.

The laminated structure 113 with its supporting release sheet 81 is shown in cross-sectional view in FIG. 6 of the drawings and, as was explained in detail previously, it will be seen that the decorative particles 44 are aranged in a random manner. In the example shown in FIG. 6 it will be seen that laminated construction or lamination 113 has a plurality of two integral decorative layers which for clarity have been shown separated by a dotted line at 115. However, it will be appreciated that such a separation of layers will not be apparent from a normal visual observation. Also, it will be appreciated that any desired number of layers may be provided in a laminated construction similar to laminated construction 113.

FIG. 7 has been presented to highlight the appearance of the laminated construction 113 which has a solid transparent plastic matrix through which the decorative particles 44 arranged therewithin may be seen from either side thereof. Further, the decorative particles 44 may be comprised of metallic foil which has not been colored but retains its bright aluminum appearance or such particles may be flock and chaff of colored sheets of aluminum foil or any other colored particles or powders as desired.

In any event, irrespective of whether the decorative lamination or laminated construction is formed utilizing the apparatus and method illustrated in FIG. 1 or the apparatus and method illustrated in FIG. 5 of the drawings, the resulting decorative lamination may be used to provide gift wrapping materials, wall coverings, counter tops, floor tile, ceiling tile, lampshades, fabric automotive interiors, and fabrics and coverings for practically any desired use where appearance is important and where optimum use may be made of a transparent solid matrix within which decorative particles may be embedded as an integral part thereof.

While present exemplary embodiments of this invention, and methods of practicing the same, have been illustrated and described, it will be recognized that this invention may be otherwise variously embodied and practiced within the scope of the following claims.

What is claimed is:

1. A method of making a decorative lamination comprising, depositing particles of decorative material on one surface of a web of material, applying a liquid film of plastic material over said one surface, said particles being substantially completely surrounded by said liquid film, and solidifying said liquid film to form a solid and substantially transparent single thickness sheet-like matrix and thereby simultaneously embed said particles within said matrix as an integral part thereof and in a single step so that portions of said particles are readily visible.

2. A method as set forth in claim 1 in which said applying step comprises extruding a film-like thermoplastic material over said particles and said solidifying step comprises cooling said film-like plastic material to bond said particles against said one surface and simultaneously define an outer surface for said lamination.

3. A method as set forth in claim 2 and comprising the further step of coating said one surface with an adhesive layer to define a tacky surface prior to said depositing step and said depositing step comprises the step of mechanically dispersing said particles on said tacky surface in a random manner.

4. A method as set forth in claim 3 in which said step of mechanically dispersing said particles comprises releasing said particles in a controlled manner from a supply receptacle and allowing them to be pulled by the force of gravity onto said tacky surface.

5. A method as set forth in claim 1 in which said particles have light reflecting surfaces which provide optimum aesthetic appeal and said depositing step comprises mechanically dispersing said particles on said one surface in a random manner.

6. A method as set forth in claim 1 in which said particles comprise colored particles and said depositing step comprises dispersing said particles on said one surface in a random manner.

7. A method as set forth in claim 1 in which said particles comprise chaff and flock of aluminum foil and said depositing step comprises the step of mechanically dispersing said chaff and flock from a supply receptacle positioned above said one surface.

8. A method as set forth in claim 3 in which said web of material has said one surface which is colored and said particles comprise chaff and flock of aluminum foil to provide optimum contrast between said chaff and flock and the background provided therefor.

9. A method as set forth in claim 1 in which said web of material comprises a release sheet in which said one surface comprises an adhesion resistant surface and comprising the further step of separating said release sheet from said sheet-like matrix with its embedded particles and using the latter as said decorative lamination.

10. A method as set forth in claim 9 in which said separating step comprises mechanically pulling apart said release sheet and said sheet-like matrix with its embedded particles.

11. A method as set forth in claim 9 in which said adhesion resistant surface is formed by the preparation step of applying an adhesion resistant coating on said web of material.

12. A method as set forth in claim 9 in which said applying step is achieved prior to said depositing step.

13. A method as set forth in claim 12 in which said applying step comprises spraying said liquid plastic film on said adhesion resistant surface.

14. A method as set forth in claim 12 in which said applying, depositing, and solidifying steps are repeated in the order stated to apply more liquid plastic film, deposit more decorative particles, and solidify the last applied liquid film and bond it against the previously formed sheet-like matrix to define a laminated construction comprised of a plurality of layers of said solid sheet-like matrix with each layer having said particles embedded therewithin.

15. A method as set forth in claim 9 in which said liquid plastic film comprises a driable plastic lacquer and said solidifying step comprises the step of drying said liquid plastic film.

16. A method as set forth in claim 15 in which said drying step comprises the step of drying said liquid film in a heated atmosphere.

References Cited

UNITED STATES PATENTS

| | | | |
|---|---|---|---|
| 3,380,876 | 4/1968 | Rusher | 156—276 X |
| 3,239,364 | 3/1966 | Carlisle et al. | 117—9 |
| 3,385,722 | 8/1968 | Weaver et al. | 156—279 X |
| 2,081,538 | 8/1937 | Hoarle. | |
| 3,565,661 | 2/1971 | Harrison | 117—9 |
| 2,343,775 | 3/1944 | Land | 156—276 X |
| 3,499,956 | 3/1970 | Mountain | 117—9 X |
| 3,215,578 | 11/1965 | Craver | 156—244 |
| 3,549,405 | 12/1970 | Schrenk et al. | 156—244 X |
| 2,175,125 | 10/1939 | Meek et al. | 156—244 X |

ALFRED L. LEAVITT, Primary Examiner

CALEB WESTON, Assistant Examiner

U.S. Cl. X.R.

117—16, 26, 29, 33; 156—244, 247